United States Patent Office.

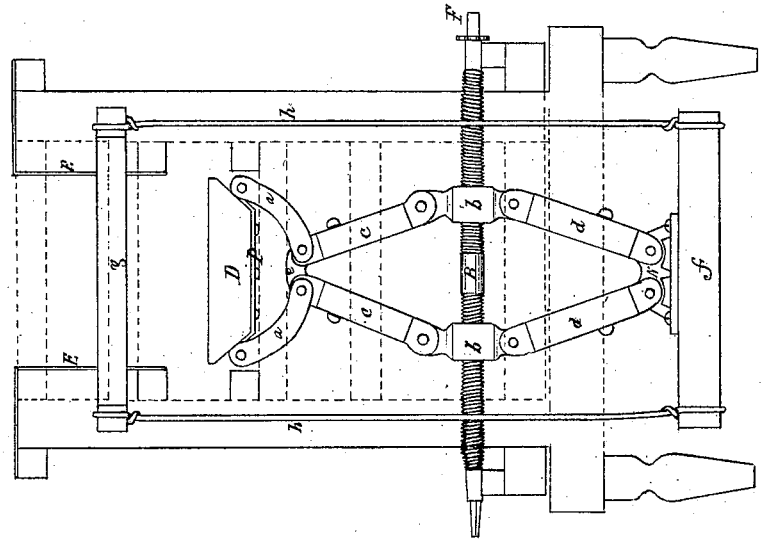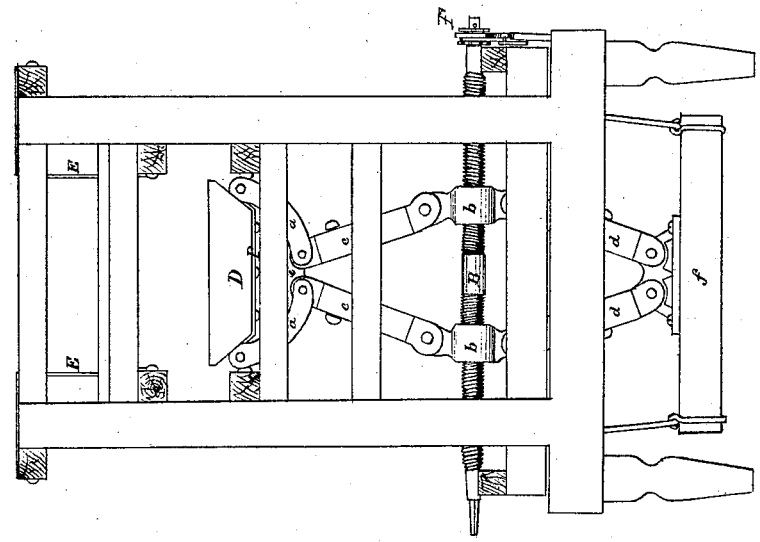

ISAAC N. PATTEN AND ELI W. LONG, OF SHELBY COUNTY, TENNESSEE.

Letters Patent No. 110,278, dated December 20, 1870.

IMPROVEMENT IN COTTON-PRESSES.

The Schedule referred to in these Letters Patent and making part of the same.

We, ISAAC N. PATTEN and ELI W. LONG, in the county of Shelby and State of Tennessee, have invented certain Improvements in Cotton-Presses, of which the following is a specification.

Figure 1 is an elevation of a machine embodying our invention.

Figure 2 is a vertical transverse sectional view of the same.

Our invention relates to a cotton or baling-press, and consists of a horizontal screw, provided with a right and left-hand thread, on which nuts work, connected at one end, by toggles, to the compound levers $a$ and head-block $b$, and at the other end to the brace $f$; and also in such arrangement and combination of the parts of the device as to produce a portable and very powerful compound lever for the intended purpose.

B is a horizontal screw, provided with right and left-hand threads, upon which work the nuts $b\ b$, which are attached to the toggles $c\ c$ and $d\ d$.

The toggles $c\ c$ are held together by the brace $e$.

The toggles $d\ d$ are attached to the brace $f$, the metallic piece N being rigidly fastened thereto.

A A are levers, which are hinged to the toggles $c\ c$ at one end thereof, and to the platen D at their opposite extremity.

D is the platen, upon which is placed the material to be pressed.

The rods $h\ h\ h\ h$ are rigidly attached to the braces $g$ and $f$, and are designed to receive the strain of the pressure.

E E are guides for the brace $g$.

F is a crank, with which the screw is rotated and the device operated, the said crank having pivoted thereto the clutch S, which, together with the ratchet I, prevents the return of the screw.

P is a metallic rest, to which is rigidly attached the head-block or platen D.

Claims.

1. The combination and arrangement of the screw B, nuts $b\ b$, toggles $c\ c$, levers $a\ a$, brace $e$, and platen D, substantially as shown and described.

2. The combination and arrangement of the screw B, nuts $b\ b$, toggles $c\ c$ and $d\ d$, levers $a\ a$, brace $e$, platen D, braces $f$ and $g$, and rods $h$, substantially as shown and specified.

ISAAC N. PATTEN.
ELI W. LONG.

Witnesses:
A. R. HAMES,
L. B. MCFARLAND.